April 25, 1939.   G. J. ZAIO   2,155,577
CLOSET SEAT FOR INFANTS
Filed July 5, 1938   2 Sheets-Sheet 1
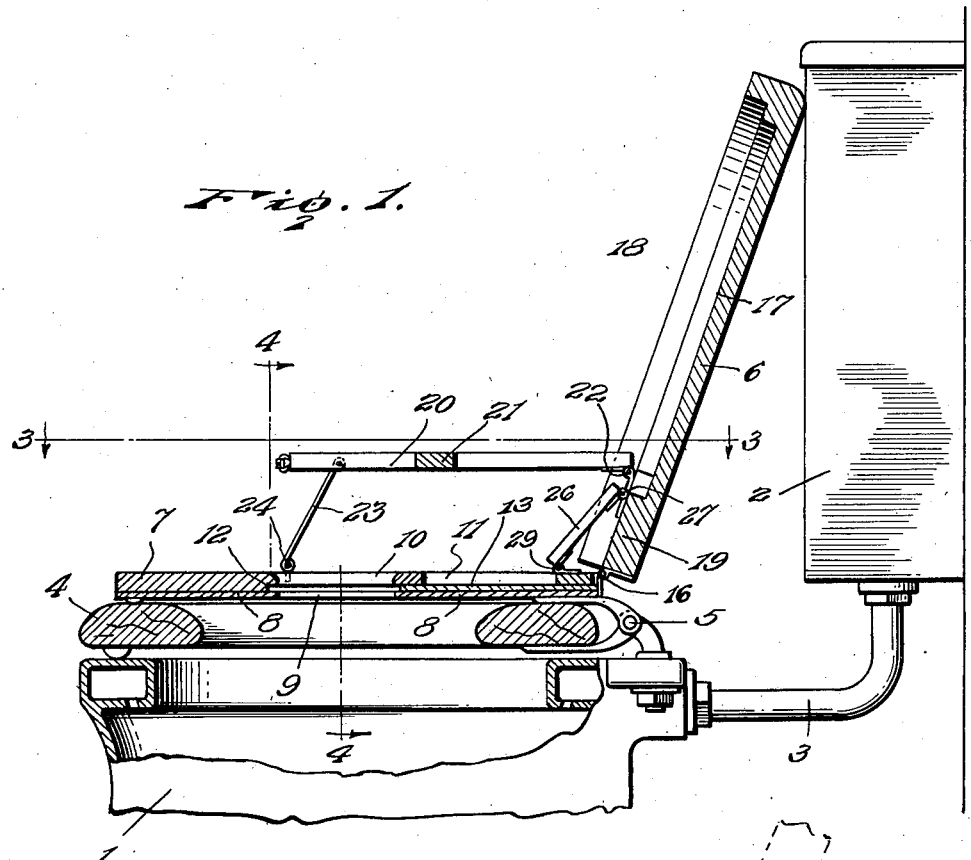
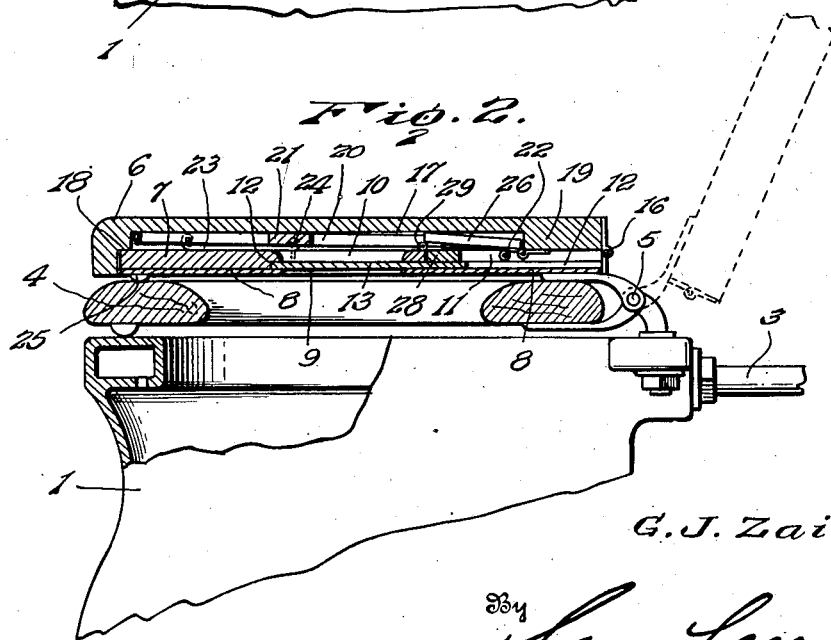
Inventor
G. J. Zaio.
By Lacey & Lacey, Attorneys April 25, 1939. G. J. ZAIO 2,155,577
CLOSET SEAT FOR INFANTS
Filed July 5, 1938 2 Sheets—Sheet 2

Inventor
G. J. Zaio.
By Lacey & Lacey, Attorneys

Patented Apr. 25, 1939

2,155,577

UNITED STATES PATENT OFFICE 2,155,577

CLOSET SEAT FOR INFANTS

George J. Zaio, Iron Mountain, Mich.

Application July 5, 1938, Serial No. 217,516

9 Claims. (Cl. 4—235)

This invention relates to a closet seat for infants and it is one object of the invention to provide a closet seat which is, in fact, an auxiliary seat mounted between the main seat and the cover and adapted to be housed in the cover when not in use and easily swung downwardly into position to rest upon the main seat for use after raising the cover.

Another object of the invention is to provide an auxiliary seat having arms associated therewith to prevent an infant from falling while occupying the auxiliary seat, the arms being so mounted that movement of the auxiliary seat into position for use will cause the arms to assume a horizontal position in vertical spaced relation to the auxiliary seat while movement of the auxiliary seat to a retracted or folded position against the cover will cause the arms to be shifted toward the auxiliary seat and disposed flat against the same between the auxiliary seat and the cover.

Another object of the invention is to provide the auxiliary seat with an opening and a closure for the opening, the closure being slidably mounted for movement into and out of closing relation to the opening of the auxiliary seat and so connected with the cover that movement of the auxiliary seat into position for use will cause the cover strip to be moved out of closing relation to the opening, whereas during movement of the auxiliary seat to its inoperative position against the cover the closure strip will be moved into closing relation to the opening.

Another object of the invention is to so mount the closure strip for the opening of the auxiliary seat that, when it is in the closing position and the auxiliary seat nested in a pocket formed in the under face of the cover, the closure strip will completely close and conceal the opening in the auxiliary seat and impart a neat appearance when the cover is raised without lowering the auxiliary seat.

Another object of the invention is to so form the cover and the auxiliary seat that, when the cover is raised without lowering the auxiliary seat, this auxiliary seat will appear to be a portion of the cover and thus be prevented from detracting from the appearance of the raised cover.

The invention is illustrated in the accompanying drawings, wherein

Figure 3:
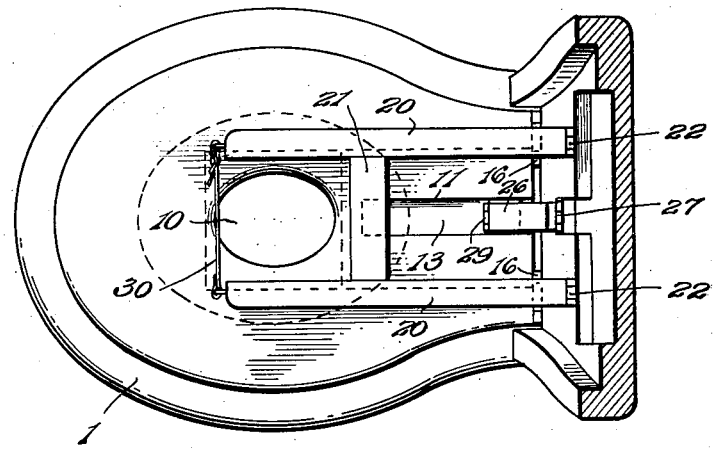
Figure 4:
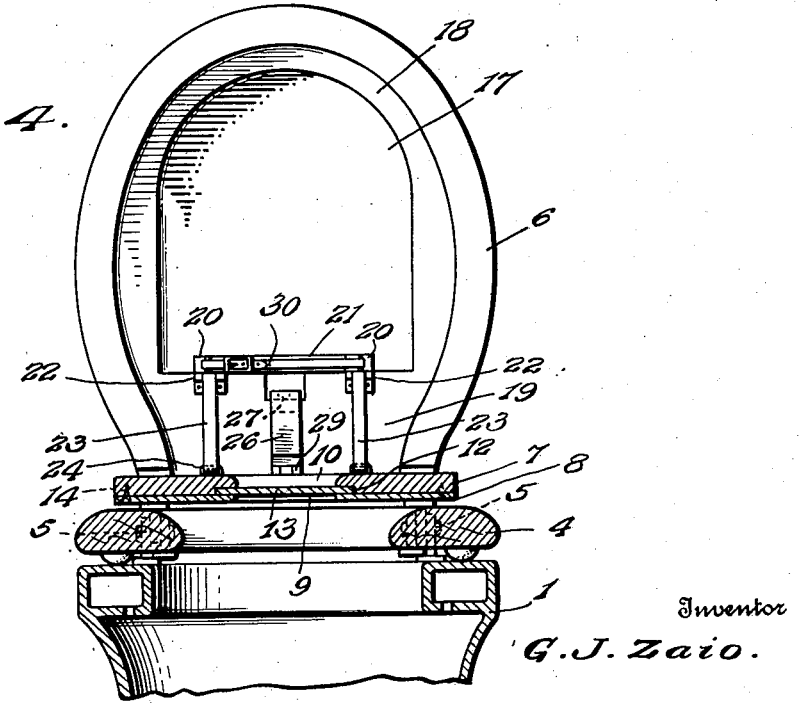

Figure 1 is a vertical sectional view showing the cover raised and the auxiliary seat in a lowered position for use, Figure 2 is a view similar to Figure 1 showing the cover in the lowered or closed position and the auxiliary seat nested within the cover, Figure 3 is a view taken along the line 3—3 of Figure 1 and showing the cover in transverse section and the auxiliary seat and main seat in top plan, and Figure 4 is a transverse sectional view taken along the line 4—4 of Figure 1.

The bowl, which is indicated in general by the numeral 1, is of a conventional formation and with this bowl is associated a flush tank 2 which is also of a conventional construction and provided with the usual outlet pipe 3 through which water is delivered from the flush tank to the bowl. A main seat 4 of the usual form is disposed over the bowl and mounted for vertical swinging movement from a raised position to a lowered position by hinges 5 which may be of any specific formation desired. The cover 6 is of a special formation and there has also been provided an auxiliary seat 7 of a special construction for use by infants and disposed between the cover and the main seat. The auxiliary seat and the covers constitute the subject-matter of this invention.

The auxiliary seat may be formed of wood or any other suitable material and has its lower face covered by a facing sheet 8 which has a portion cut out to provide an opening 9 of approximately the same size as the opening 10 formed in the auxiliary seat. The rear portion of the facing sheet 8 extends in underlying relation to an opening 11 formed in the auxiliary seat back of the opening 10, and upon referring to Figure 4, it will be seen that the intermediate portion of the auxiliary seat through which the openings 10 and 11 are formed is reduced in thickness from its under face to provide a channel 12 extending longitudinally of the auxiliary seat and slidably receiving a closure plate or strip 13. The closure plate or strip 13 is formed of the same type of material as that from which the auxiliary seat is formed, and, therefore, when the cover and the auxiliary seat are swung upwardly to a raised position, the opening 9 and the under face of the closure plate which has been moved forwardly into closing relation to the opening 10 will appear to be merely a depression in the under face of the auxiliary seat. The facing sheet 8 is preferably removably secured by a suitable number of fasteners 14 in order that it may be removed when installing the closure plate 13 but if the auxiliary seat is of molded composition the channel 12 in which the closure plate slides may be formed during the molding operation and the closure plate slid into place through the open rear end of the channel.

The auxiliary seat is hinged to the main seat by hinges 5 and the cover 6 is hinged to the auxiliary seat by hinges 16, and referring to Figures 1 and 4, it will be seen that the cover is recessed from its under face to form a pocket 17 having a ledge 18 extending about its margins and also across its rear end, as shown at 19, the distance from the inner surface of marginal portions of the cover to the ledges 18 and 19 being such that, when the auxiliary seat is in its inoperative position, it may fit snugly into the recessed under face of the cover and bear against the ledges or shoulders 18 and 19 with its under face flush with the marginal portions of the seat, as shown in Figure 2. Arms 20 which are connected intermediate their ends by a cross bar 21 extend longitudinally of the auxiliary seat and the cover and the arms have their rear ends hinged to the ledge or shoulder 19 by hinges 22 while their forward end portions have pivoted thereto the upper ends of struts or props which have their lower ends pivoted to the auxiliary seat at opposite sides of the opening 10 by pivot members 24. By so mounting the arms they will be disposed in a substantially horizontal position in vertical spaced relation to the auxiliary seat when the auxiliary seat is in its lowered or operative position and when the auxiliary seat is in its inoperative position in which it is nested in the recess of the cover the arms will be disposed close against the upper face of the auxiliary seat and housed in the recess 17 of the cover together with the auxiliary seat. A latch 25 of a suitable formation may be provided in order to releasably hold the auxiliary seat in the inoperative position in which it is nested in the cover. The cover plate or strip 13 must be shifted longitudinally into and out of closing relation to the opening 10 during movement of the auxiliary seat and the cover relative to each other, and in order to do so, there has been provided a bar or link 26 which extends longitudinally of the auxiliary seat and cover and has one end pivotally connected with the ledge or shoulder 19 by a hinge 27 and its other end pivoted to a block 28 at the rear end of the closure plate or strip by a hinge 29. When the auxiliary seat is swung to its folded or inoperative position within the recess of the cover, the link 26 exerts a pushing action to shift the closure plate forwardly into position to close the opening 10, as shown in Figure 2, and when the auxiliary seat is swung downwardly from the cover into position for use, the link acts as a drag and the closure plate will be shifted rearwardly out of closing relation to the opening 10 to the position shown in Figure 1. It will thus be seen that the closure plate will be automatically moved into and out of closing relation to the opening of the auxiliary seat. A strap 30 to prevent a small baby from falling off the auxiliary seat is carried by the forward end of one arm and detachably engaged with the forward end of the other arm and since the cross bar 21 is located between the arms in position to dispose it back of the opening 10, as shown in Figures 1 and 3, it may serve as a back rest.

Having thus described the invention, what is claimed as new is:

1. In a device of the character described, a main seat, a cover, an auxiliary seat between the cover and the main seat and formed with an opening for registering with an opening in the main seat when the auxiliary seat is in a lowered position upon the main seat, a closure for the opening in the auxiliary seat, and a connection between the closure and said cover for imparting movement to the closure into and out of closing relation to the opening in the auxiliary seat when the cover and the auxiliary seat are moved relative to each other.

2. A device of the character described comprising a main seat having an opening therein, an auxiliary seat over said main seat having an opening for registering with the opening of the main seat when the auxiliary seat is in a lowered position upon the main seat, a cover over said auxiliary seat, the cover and the auxiliary seat being hingedly mounted for vertical swinging movement as a unit and independent of each other, a closure for the opening in the auxiliary seat movable into and out of closing relation to the opening, a connection between the cover and said closure for moving the closure into and out of a closed position when the cover and the auxiliary seat are moved relative to each other, and arms extending longitudinally of the auxiliary seat at opposite sides of the opening therein and connected with the cover and the auxiliary seat for movement from a position spaced vertically above the auxiliary seat to a lowered position against the auxiliary seat when the cover is moved from a raised position with the auxiliary seat lowered to a lowered position and resting upon the main seat about the auxiliary seat.

3. A device of the character described comprising a main seat formed with an opening, an auxiliary seat hinged at the rear end of the main seat and formed with an opening for registering with the opening of the main seat when the auxiliary seat is in a lowered position upon the main seat, a cover hinged to said auxiliary seat for movement from a raised position to a lowered position about the auxiliary seat, a closure slidably carried by the auxiliary seat for movement longitudinally thereof into and out of closing relation to the opening of the auxiliary seat, and a thrust member extending longitudinally of the auxiliary seat and pivoted at its ends to the cover and the closure for imparting sliding movement to the closure when the cover and the auxiliary seat are moved relative to each other.

4. In a device of the character described, a main seat having an opening, an auxiliary seat over the main seat hinged at the rear end of the main seat for vertical swinging movement from a raised position to a lowered position and formed with an opening for registering with the opening of the main seat when the auxiliary seat is in its lowered position, a closure for the opening of the auxiliary seat slidable longitudinally thereof into and out of a closing position, a cover hinged at its rear end to the rear end of the auxiliary seat for vertical swinging movement from a raised position to a lowered position about the auxiliary seat, a pitman strip extending longitudinally of the auxiliary seat with its rear end hinged to the rear end portion of said cover and its forward end hinged to the rear end portion of said closure strip and serving to impart sliding movement to the closure strip when the cover is moved vertically relative to the auxiliary seat, arms extending longitudinally of the auxiliary seat at opposite sides of the opening therein and having their rear ends hinged to the rear portion of said cover, and struts pivoted to forward end portions of said arms and to the auxiliary seat and movable with the arms from a collapsed position against the auxiliary seat to a raised position for supporting the forward ends of the arms.

5. In a device of the character described, a main seat having an opening therein, an auxiliary seat for resting upon the main seat, said auxiliary seat having an opening therein for registering with the opening of the main seat, a cover over said auxiliary seat, the cover and the auxiliary seat being hingedly mounted for swinging movement as a unit and independent of each other from a lowered position to a raised position, said cover having its inner face recessed to form a pocket to receive the auxiliary seat when the auxiliary seat and the cover are both in a raised or lowered position, a closure for the opening of the auxiliary seat movable into and out of closing relation thereto, and a connection between the cover and said closure for imparting movement to the closure when the cover and the auxiliary seat are moved relative to each other.

6. In a device of the character described, a main seat, an auxiliary seat, a cover, the auxiliary seat being disposed between the cover and the main seat, hinges mounting the cover and the auxiliary seat for swinging movement vertically relative to the main seat and each other from a raised position to a lowered position, said cover being recessed from its inner face to provide a pocket having ledges around its margins engaged by the auxiliary seat when the auxiliary seat is disposed within the pocket of the cover, arms extending longitudinally of the auxiliary seat in spaced relation to each other transversely thereof and having their rear ends hinged to a portion of said ledge across the rear end of the cover, props for forward ends of said arms pivoted to the arms and to the auxiliary seat, said arms being movable from an elevated position over the auxiliary seat to a collapsed position against the auxiliary seat and when collapsed being disposed within the pocket of the cover, the auxiliary seat being formed with an opening, and a closure for the opening of the auxiliary seat connected with said cover for movement into and out of closing relation to the opening when the cover and the auxiliary seat are moved relative to each other.

7. In a device of the character described, a main seat having an opening, a cover over the main seat, an auxiliary seat between the cover and the main seat and formed with an opening, arms for the auxiliary seat extending longitudinally thereof between the cover and the auxiliary seat and hinged to said cover, props for said arms pivoted to the arms and to the auxiliary seat, the cover being formed with a pocket to receive the auxiliary seat and said arms when the cover and the auxiliary seat are both in either a raised or a lowered position, a closure for the opening of said auxiliary seat, and a connection between the closure and the cover for moving the closure into and out of closing relation to the opening of the auxiliary seat when the cover and the auxiliary seat are moved relative to each other.

8. In a device of the character described, a main seat having an opening, a cover, an auxiliary seat between the cover and the main seat formed with an opening, the cover and the auxiliary seat being hingedly mounted for vertical swinging movement from a raised position to a lowered position upon the main seat, a closure for the opening of the auxiliary seat movably mounted, a connection between the cover and said closure for moving the same into and out of closing relation to the opening of the auxiliary seat when the cover and the auxiliary seat are moved relative to each other, arms extending longitudinally of the auxiliary seat and having their rear ends hinged to said cover, supports for forward ends of said arms pivoted to the arms and to the auxiliary seat, and a cross bar extending between said arms in spaced relation to their forward ends and disposed back of the opening of the auxiliary seat to provide a back rest when the cover is raised with the auxiliary seat resting upon the main seat and the arms in an elevated position.

9. In a device of the character described, a main seat, a movable cover, an auxiliary seat formed with an opening for registering with an opening in the main seat, a closure for the opening in the auxiliary seat, and means for imparting movement to the closure into and out of closing relation to the opening in the auxiliary seat when the cover and the auxiliary seat are moved relative to each other.

GEORGE J. ZAIO.